United States Patent [19]
Jorgensen et al.

[11] Patent Number: 6,003,624
[45] Date of Patent: Dec. 21, 1999

[54] STABILIZING WHEELED PASSENGER CARRIER CAPABLE OF TRAVERSING STAIRS

[75] Inventors: Glen Howard Jorgensen, Woodinville; Joseph L. Garbini, Seattle, both of Wash.

[73] Assignee: University of Washington, Seattle, Wash.

[21] Appl. No.: 08/468,976

[22] Filed: Jun. 6, 1995

[51] Int. Cl.[6] .................................................. B62D 61/12
[52] U.S. Cl. .......................... 180/6.5; 180/7.1; 180/21; 180/65.8; 180/907; 280/5.2; 701/124
[58] Field of Search .................. 180/7.1, 6.5, 8.2, 180/21, 65.1, 65.8, 8.3, 8.5, 8.6, 907, 218, 209; 280/5.22, 5.28, DIG. 10; 901/1; 701/22, 38, 70, 124

[56] References Cited

U.S. PATENT DOCUMENTS

| | | |
|---|---|---|
| 880,828 | 3/1908 | Redfield .................................. 180/218 |
| 2,224,411 | 12/1940 | Smith ...................................... 180/218 |
| 3,438,641 | 4/1969 | Bradley .................................. 280/5.28 |
| 3,592,282 | 7/1971 | Soileau ................................... 180/8 A |
| 3,976,152 | 8/1976 | Bell ............................................ 180/9 |
| 4,108,449 | 8/1978 | Rhodes .................................. 280/5.28 |
| 4,432,425 | 2/1984 | Nitzberg ................................. 180/8 A |
| 4,432,426 | 2/1984 | Misawa ................................... 180/8 A |
| 4,556,229 | 12/1985 | Bihler et al. .......................... 280/5.22 |
| 4,566,550 | 1/1986 | Misawa ................................... 180/8.2 |
| 4,566,706 | 1/1986 | Bihler et al. .......................... 280/5.22 |
| 4,566,707 | 1/1986 | Nitzberg ................................. 180/8.2 |
| 4,569,409 | 2/1986 | Kluth ...................................... 180/8.2 |
| 4,618,155 | 10/1986 | Jayne ..................................... 280/5.28 |
| 4,666,170 | 5/1987 | Vasa .................................... 280/47.19 |
| 4,671,369 | 6/1987 | Tiffin et al. ............................. 180/8.1 |
| 4,674,584 | 6/1987 | Watkins .................................. 180/8.2 |
| 4,771,839 | 9/1988 | Misawa ................................... 180/8.2 |
| 4,892,323 | 1/1990 | Oxford ................................. 280/250.1 |

(List continued on next page.)

FOREIGN PATENT DOCUMENTS

| | | |
|---|---|---|
| 305082 | 6/1987 | Japan .................................... 180/209 |
| 2190277 | 7/1990 | Japan . |
| 89/06117 | 7/1989 | WIPO . |

OTHER PUBLICATIONS

"A Wheeled Inverse Pendulaum Type Self–Contained Mobile Robot and its Two–Dimensional Trajectory Control" by Koyanagi et al, International Synposium on Measurement and Control in Robotics, Nov. 15–19, 1992.

APPENDIX, Generation of Equations of Motion and State, by Glen Jorgensen, 1995.

"The Curb Traversing Wheelchair," article by DelNegro and March, Presented at the 1994 International Mechanical Engineering Cong. & Exhib. of the winter annual meeting at Chicago, Ill. No. 94–WA/DE–10; The American Soc. of Mech. Engs., 345 E. 47th St., NY NY 10017.

"A Look–Up Table–Based Self–Organizing Fuzzy Plus Linear Controller," by Lee, Kim & Suh, *Mechatronics*, vol. 4, No. 1, pp. 71–90, 1994. Printed in Great Britian.

"Taking Andros for a Walk," by White et al., Nuclear Engineering International, p. 52–53, Mar. 1989.

(List continued on next page.)

*Primary Examiner*—Anne Marie Boehler
*Attorney, Agent, or Firm*—Kathleen T. Petrich

[57] ABSTRACT

A double-inverted wheeled passenger carrier (WPC) that is actively stabilizing on two or more axially-spaced wheels through a controller that senses and adjusts three degrees of freedom that allows the WPC to actively stabilize itself to keep a passenger essentially upright during movement, including traversing stairs and the like. The WPC (10) includes a wheel assembly (12) having at least two axially-spaced wheels (14), each wheel having an axis of rotation (15), a frame (16) having a first pivot (18) and second pivot (22), and a chair (20). The frame (16) is attached to the wheel assembly (12) at the first pivot (18). The chair (20) is attached to the frame (16) at the second pivot (22), allowing the chair (20) to rotate independently of the wheels (14).

13 Claims, 6 Drawing Sheets

U.S. PATENT DOCUMENTS

| | | | |
|---|---|---|---|
| 4,898,256 | 2/1990 | Lehner | 180/8.2 |
| 4,915,184 | 4/1990 | Watkins | 180/8.2 |
| 4,951,766 | 8/1990 | Basebow et al. | 180/907 |
| 5,020,818 | 6/1991 | Oxford | 280/250.1 |
| 5,036,929 | 8/1991 | Trougouboff | 180/907 |
| 5,123,495 | 6/1992 | Littlejohn | 280/DIG. 10 |
| 5,149,118 | 9/1992 | Oxford | 280/250.1 |
| 5,158,309 | 10/1992 | Quigg | 280/5.22 |
| 5,197,558 | 3/1993 | Misawa | 180/8.2 |
| 5,230,522 | 7/1993 | Gehlsen et al. | 280/5.3 |
| 5,263,547 | 11/1993 | Alber | 180/8.2 |
| 5,312,127 | 5/1994 | Oxford | 280/304.1 |
| 5,335,741 | 8/1994 | Rabinovitz et al. | 180/8.2 |
| 5,395,129 | 3/1995 | Kao | 280/5.22 |
| 5,592,997 | 1/1997 | Ball | 180/65.1 |
| 5,701,965 | 12/1997 | Kamen | 180/7.1 |

OTHER PUBLICATIONS

"Development of Mobile Maintenance Robot System 'AIMARS'," by Nakayama et al., Proceedings of the USA/Japan Symposium on Flexible Automation Crossing Bridges: Advances in Flexible Automation and Robotics, ASME, NY NY, c. 1988.

"Postural and Driving Control of the Controlling Arm–Wheel–Type Parallel Bicycle," by Yamafuji, *20th ISIR*, pp. 227–234, Oct. 1989.

Technical Article: "Study on the Postural and Driving Control of a Coaxial Bicycle," No. 87–0901 May 1988, Japanese (Not translated.) by Yamafuji et al. pp. 1114–1121.

Technical Article: Study on the Control of the Variable–Structure–Type Locomotive Robot (2nd Report; Walking forms and controlling methods of the leg–leg type); by Hirabayashi et al., No. 89–1175 B, Sep. 1990. Japanese (Not translated.) pp. 136–141.

Technical Article: Motion Control of the Parallel Bicycle–Type Mobile Robot Composed of a Triple Inverted Pendulum (2nd Report: Driving control); by Momoi et al., 90–1553 B, Sep. 1991. Japanese (Not translated.) pp. 154–159.

Technical Article: "Synchronous Steering Control of a Parallel Bicycle," by Yamafuji,et al., No. 88–1181, May 1989, pp. 1229–1234.

Translated Article, "Motion Control of the Parallel Bicycle–Type Mobile Robot which is Composed of a Triple Inverted Pendulum (1st Report, Stability Control of Standing Upright, Ascending and Descending Stairs;" Nihon Kikai Gakki Rombunshu, vol. 57, No. 538 (Jun. 1991).

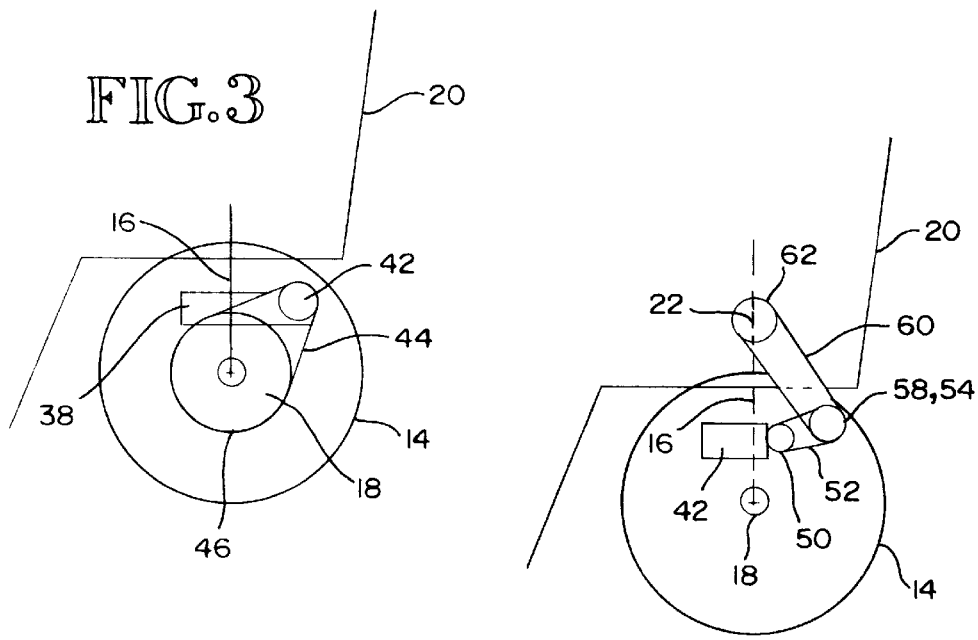
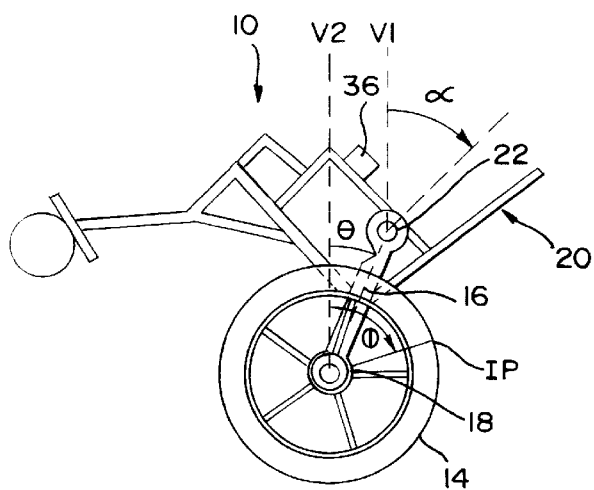
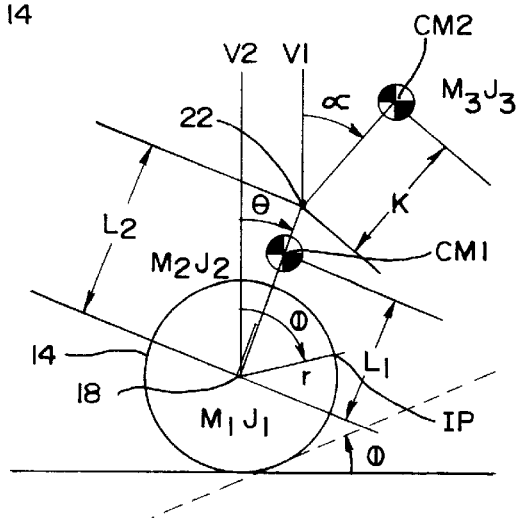
FIG.3
FIG.4
FIG.5
FIG.6

STABILIZING WHEELED PASSENGER CARRIER CAPABLE OF TRAVERSING STAIRS

TECHNICAL FIELD

This invention relates to an apparatus and a method of operating a motorized wheeled passenger carrier capable of traversing stairs. More specifically, this invention relates to a wheel-mounted, double-inverted pendulum-type wheeled passenger carrier (WPC) that is actively stabilizing on two or more axially-spaced wheels through a controller that senses and adjusts multiple degrees of freedom and that allows the WPC to actively stabilize itself to keep a passenger essentially upright during movement, including traversing stairs and the like.

BACKGROUND OF THE INVENTION

Stairs, curbs, steep ramps, and irregular terrain have long been challenging for wheelchair users to navigate. Despite changes in U.S. federal law to make public buildings and work places more wheelchair accessible, there is a need for wheelchairs that can traverse stairs, curbs and the like. Attempts have been made to design wheelchairs that are capable of climbing stairs, and the like, although the prior art has addressed this problem through mechanical devices, such as cat-tracks, telescoping/manipulating legs, treadmills, articulated axles, and various other mechanical methods including ramps, cable hoists, and low center of gravity designs. Many of the commercial embodiments of such mechanical devices are too heavy and too expensive for the average wheelchair user. In addition, many of these inventions are cumbersome and require some mechanical adjustments, such as laying cat-tracks, to traverse stairs, and, as such, require some dexterity and a degree of physical strength on the part of the wheelchair user. There still exists a need for a relatively lightweight and inexpensive stair-climbing wheelchair, that does not rely on the physical capabilities of the user.

An object of this invention is to provide a relatively lightweight and inexpensive motorized wheeled passenger carrier (WPC) that uses an electronic controller to actively stabilize the WPC and which is capable of traversing stairs and the like, without regard to any physical capabilities of the passenger.

DISCLOSURE OF THE INVENTION

This invention relates to a method and apparatus for an actively stabilizing wheeled passenger carrier (WPC) that is capable of traversing stairs and the like. The WPC includes a wheel assembly, a rigid frame and a chair. The wheel assembly has at least two axially-spaced wheels, each wheel having an axis of rotation. The frame has at least two pivots. The first pivot attaches the frame to the wheel assembly. The second pivot attaches the frame to the chair, allowing the chair rotational movement about the second pivot independent of the wheels. The WPC also includes a first motor assembly to apply torque between the frame and the wheels, and a second motor assembly to apply torque between the frame and the chair. The WPC also includes a control means to sense and control three degrees of freedom: the first being an angle between the chair and a vertical position, the second being an angle between the frame and the vertical position, and the third being an angle between the wheels and an initial position, such control being accomplished through application of torques from the first and second motor assemblies. The control means to sense and control the three degrees of freedom allows the WPC to actively stabilize itself in order to keep a passenger essentially upright during movement, including traversing stairs and the like.

In preferred form, the WPC is actively stabilizing on two or more axially-spaced wheels through the control means. The control means includes an electronic controller. The wheels are axially-coincident to each other. The WPC comprises a double-inverted pendulum mounted to the wheels. The first motor assembly includes a motor and a gear box mounted at each wheel, with the motors and gear boxes mounted above the first pivot. The second motor assembly also includes a motor and a gear box. At least one idler wheel may be included to convert the wheeled passenger carrier to a standard wheelchair.

Also in preferred form, the control means includes a means to directly sense three measured outputs: an absolute angular acceleration of the frame, and relative angular velocities of the chair and the wheels with respect to the frame. Three velocity states are calculated from the three measured outputs, which are absolute angular velocities of the frame, chair and wheels. A reduced-order estimator estimates the values of the three degrees of freedom based on the three velocity states. The electronic controller controls and senses the WPC through either a full state feedback loop and a feed forward command, a full state feedback loop and an integral error feedback loop, or a combination of all three.

Another aspect of the invention includes an alternative embodiment of the WPC that is capable of traversing stairs. In this embodiment, the chair is rigidly attached to the frame and only includes one motor assembly, which applies torque between the frame and the wheels. The WPC also includes a control means, but this WPC sense only two degrees of freedom: the first being an angle between the chair/frame and a vertical position, and the second being an angle between the wheels and an initial position. Like the first embodiment, the control is accomplished through application of torque from the motor assembly.

Another alternative embodiment includes a WPC capable of traversing stairs in which the chair is attached to the frame through a linkage. The linkage replaces the second pivot of the invention. With the linkage, the chair translates along the linkage, and, hence, there exists a different degree of freedom to control. The WPC includes a first motor assembly to apply torque between the frame and the wheels, and a second motor assembly to apply torque between the frame and the chair. The WPC also includes a control means to sense and control three degrees of freedom: the first being a distance that the chair travels along the linkage, the second being an angle between the frame and a vertical position, and the third being an angle between the wheels and an initial position.

In preferred form, the linkage of the frame may be a linear linkage or a parallelogram linkage. In an alternate embodiment, the frame may be connected to the linkage through a pivot. With the pivot and linkage combination, an additional degree of freedom is sensed and controlled: an angle between the chair and the vertical position.

Another aspect of the invention includes a method of operating a WPC that is carrying at least one passenger and is traversing stairs and the like. The WPC has a wheel assembly, a rigid frame, and a chair like the WPC in the first embodiment, except that the frame has at least one pivot axis where the frame is attached to the wheel assembly. A motor assembly applies torque between the frame and the wheels of the wheel assembly, and a control means to sense and control multiple degrees of freedom. The method senses at least one passenger input, where one passenger input is a desired WPC velocity. The control means signal the passenger input into an electronic controller and form a system input. The system input is signalled to the motor assembly. The torque application from the motor assembly effects a change in the multiple degrees of freedom. The degrees of freedom include the first degree of freedom being an angle between the frame and a vertical position, and the second degree of freedom being an angle between the wheels and an initial position. Sensors sense and measure at least two measured outputs: the first being an absolute angular acceleration of the frame, and the second being a relative angular velocity between the frame and the wheels. At least two velocity states are calculated from the measured outputs, which are absolute angular velocities of the frame and wheels. A model of the multiple degrees of freedom is estimated based on the velocity states. The controller compares the multiple degrees of freedom and the velocity states to the passenger input. The compared difference is used by the electronic controller to formulate a new system input.

In preferred form, the WPC further comprises a second pivot axis. The frame is attached to the chair at the second pivot axis, which allows the chair rotational movement about the second pivot axis independent of the wheels. The WPC also includes a second motor assembly to apply torque between the frame and the chair, and a second passenger input, wherein the passenger may input a desired chair attitude. At least two passenger inputs form the system input. The system input is signalled to the first and second motor assemblies. The torques applied from the first and second motor assemblies effect change in at least one additional degree of freedom: an angle between the chair and the vertical position. An additional measured output includes a relative angular velocity between the frame and the chair and is sensed from the absolute angular acceleration of the frame. An additional velocity state, which is the absolute angular velocity of the chair, is calculated from the additional measured output. The model estimates at least three degrees of freedom based on the at least three velocity states. The estimated model and the velocity states are compared to the at least two passenger inputs to obtain a compared value. The compared value is signalled back into the controller to form a new system input.

Also in preferred form, the method includes an electronic controller that has a full state feedback loop, a feed forward command, and an integral error loop that each provide an input to form the system inputs.

Advantages produced by the present invention are: 1) provision of a wheeled passenger carrier that actively stabilizes itself to traverse stairs and the like, 2) the ability to use mostly "off the shelf" components for construction of the invention, which significantly reduces costs, 3) the use of electronic control means enabling "two-wheel contact" instead of mechanical gadgetry, which significantly reduces the weight of the WPC, and 4) elimination of any special response or strength on the part of the passenger, which greatly expands the class of users for the WPC.

These and other advantages and features will become apparent from a review of the following detailed description of the best mode for carrying out the invention, the drawing, and the claims, all of which comprise the disclosure of the present invention and are included herein by reference.

BRIEF DESCRIPTION OF THE DRAWING

Like reference numerals are used to denote like parts throughout the several figures of the drawing, and:

FIG. 3 is a sectional view of the WPC taken substantially along 3—3 of FIG. 2 depicting only the first motor assembly;

FIG. 4 is a sectional view of the WPC taken substantially along 3—3 of FIG. 2 but depicting only the second motor assembly;

FIG. 5 is a view like FIG. 1, but depicting three degrees of freedom;

FIG. 6 is a schematic diagram of FIG. 5 showing physical parameters important to the WPC stability;

BEST MODE FOR CARRYING OUT THE INVENTION

Figure 1:
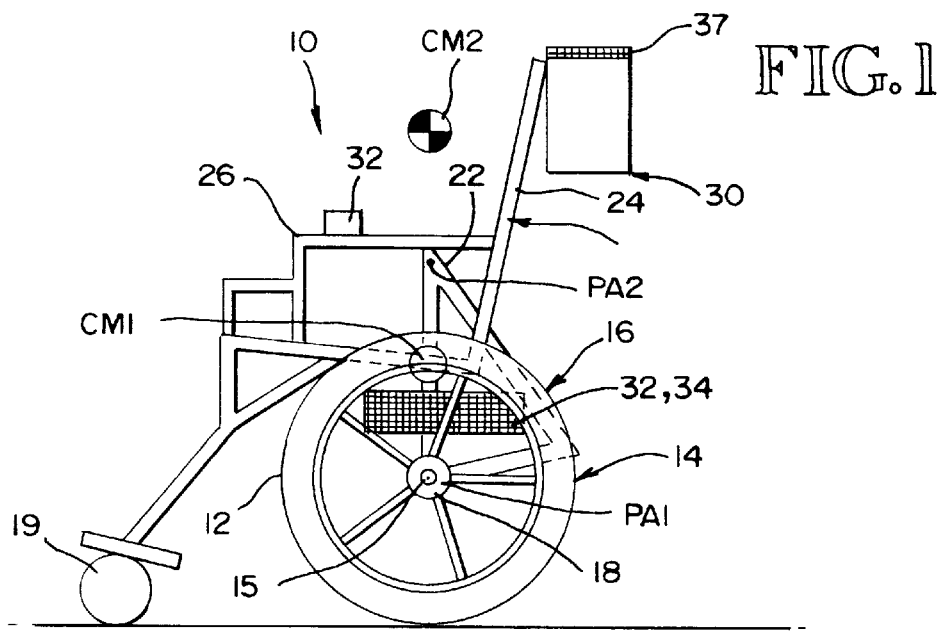
FIG. 1 is an side elevational view of a wheeled passenger carrier ("WPC") depicting the center of mass of a chair and its passenger (passenger not shown) positioned above a pair of pivots of a frame.

Referring to FIG. 1, this invention provides an actively stabilizing wheeled passenger carrier (WPC) 10 that is capable of traversing stairs, curbs, steep ramps, and irregular terrain with just two wheels normally in contact with the ground. The term "wheeled passenger carrier" is meant to encompass single occupancy wheelchairs, and the like. The WPC 10 of this invention includes a wheel assembly 12 having two wheels 14 (only one shown) and an axis of rotation 15 at each wheel. In preferred form, the wheels 14 are coincident. A frame 16 is mounted to the wheel assembly 12 at a freely-rotatable first pivot 18. The frame 16 is schematically depicted as a triangular tress for added structural support. A chair 20, in which a passenger sits, is positioned within frame 16 and above wheels 14. The chair 20 is mounted to frame 16 at a freely-rotatable second pivot 22. The frame 16 actually rotates about wheels in a pivot axis PA1 that is generated about first pivot 18. The chair 20 rotates about the frame in a pivot axis PA2 that is generated about second pivot 22. The frame 16 includes an elongated back portion 24 that supports the passenger's back, a pair of arm supports 26, and a pair of foot rests 28 that provide a resting place for the passenger's feet.

In preferred form, the WPC is a double inverted pendulum, which means that a center of mass of the frame CM1 is above the first pivot 18, and a center of mass of the chair/passenger CM2 is above the second pivot 22.

The WPC also includes a power source 30, such as a battery, a first motor assembly 32, a second motor assembly 34 and a control means to sense and control multiple degrees of freedom. The control means includes an electronic controller 36, which contain one or more programmed computer chips that control the WPC stabilization and movement.

In an "on" mode, the WPC 10 positions itself into an actively stabilizing mode, (balancing mode) or, essentially, the WPC "pops a wheelie" compared to the standard position of an ordinary manual wheelchair and holds that position. (As shown in the schematic views in FIGS. 7–10). The WPC 10 actually balances the chair and frame to angles determined by the controller 36, which is constantly sampling (roughly in the area of 1000 times/second) passenger inputs and comparing the inputs to estimated states determined by measured outputs to keep the chair/passenger balanced at all times when the WPC is in the actively stabilizing mode.

In preferred form, the power source 30 maximum power consumption is estimated to be slightly less than 2500 Watts. Therefore, in preferred form, the power source 30 is a pair of standard U-1 type, 12 volt, deep-cycle batteries, commonly found on most motorized wheelchairs. Also in preferred form, the battery box (the power source 30) is mounted near the top of the elongated back portion 24 of the chair 20, near the passenger's shoulders. By mounting the battery box high on the chair, the center of mass of the chair/passenger CM2 is above the second pivot 22, allowing the frame to keep its double-inverted pendulum characteristics. Also in preferred form, a dead weight 37 may be mounted above the battery box when necessary in order to obtain a center of gravity high enough to prevent interference with the steps when the chair is leaning into a staircase. The dead weight may be approximately 11 kg, depending upon the mass and orientation of the passenger.

Figure 2:
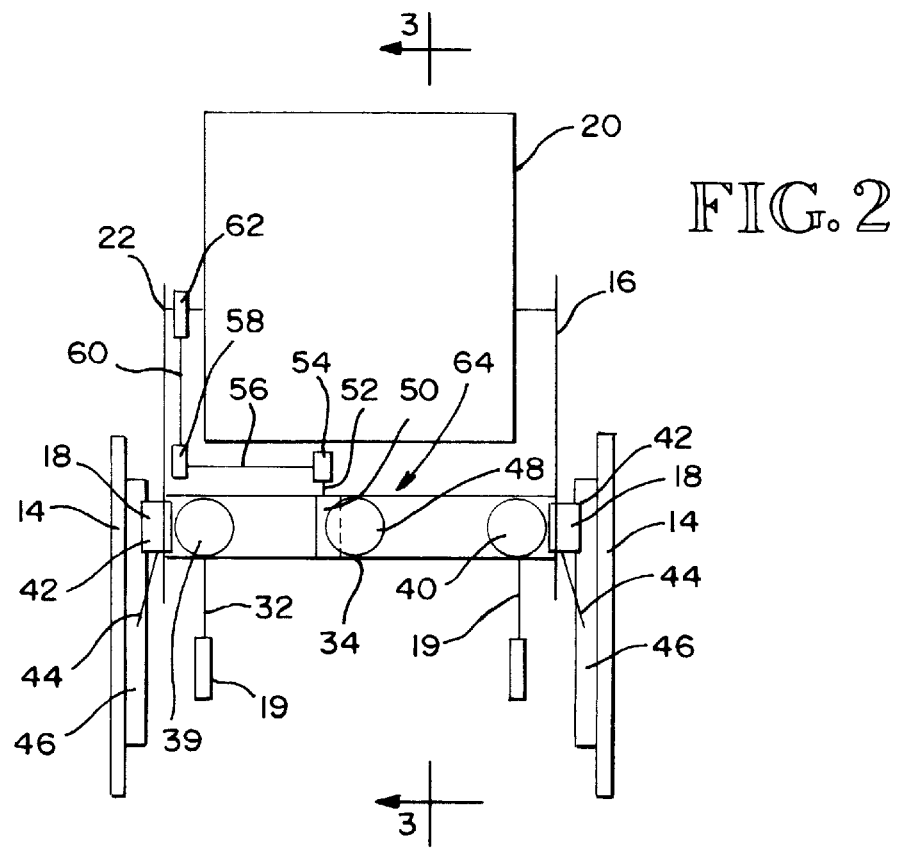
FIG. 2 is a schematic back view of the WPC depicting first and second motor assemblies.

By way of a non-limitive example, torque may be applied by electric motors at each wheel. Referring to FIGS. 2-3, the first motor assembly 32 includes a pair of motors 38, 40, one motor positioned at each wheel, to apply torque between the frame 16 and the wheels 14. Motors 38, 40 are positioned one at each wheel to allow each wheel independent movement. Motors 38, 40 may have a worm gear reducer, such as the Magna Tech motor by the Abart Gear and Machine Company. Motors 38, 40 each include a gear box 42. The gear boxes 42 provide a first gear reduction. A belt 44 provides torque from the gear box to a sheave 46 at each wheel 14. The sheave 46 is connected to the first pivot 18 and the wheels 14. The belt 44 and sheave 46 provide a second gear reduction.

The torque requirements for traversing stairs are slightly more than that of a standard motorized wheelchair. The peak torque requirement is estimated at approximately 500 N-m. Conventional wheelchairs use two motors that have essentially 400 N-m total torque, based on a stall torque of 5 N-m and a gear ratio to the wheels of 40:1. A gear ratio change on the standard wheelchair motor, or obtaining a slightly larger motor will easily provide the 500 N-m torque required, so specialized motors are not required. Thus, two standard wheelchair motors, with slight modifications to its gear ratio will suffice for this invention.

Referring to FIGS. 2 and 4, the second motor assembly 34 includes a motor 48 and a gear box 50. Motor 48 and gear box 50 are mounted adjacent the first motor pair 38, 40 and applies a torque between the frame 16 and the chair 20. This torque allows the chair 20 to tilt or lean from a referenced vertical position, which is referred to as the chair attitude later. The motor of the second motor assembly may be sized smaller that the motors for the wheels, as less torque is required, but may be like the Magna Tech motor in the first motor assembly 32. The second motor 48 may be connected to the chair in a variety of ways. One such way includes a belt 52 from the gear box 50 running to an idler sheave 54. The idler sheave 54 runs a belt 56 to an auxiliary sheave 58. The auxiliary sheave 58 runs a belt 60 to a sheave 62 connected to the chair 20 and the second pivot 22. A common housing 64 (shown in FIG. 2) may house all three motors: 38, 40, and 48. In preferred form, the common housing 64 is positioned above the first pivot 18, which keeps CM1 above the first pivot to ensure the double-inverted pendulum structure. The application of torque may be provided in other forms. The example here is meant to be non-limitive.

One or more idler wheels 19 may be added at the footrest to convert the WPC to a standard wheelchair when the actively stabilizing mode is off, and to provide extra security for the passenger in the case of a power failure, or the like.

Referring now to FIG. 5, the controller 36 controls three degrees of freedom (which are also states): the first being an angle a between the chair 20 and a first vertical position V1, the second being an angle $\theta$ between the frame 16 and a second vertical position V2, and the third being an angle $\phi$ between the wheels 14 and an initial position IP. In use, the imaginary vertical lines V1 and V2 are measured from one true vertical (not shown), which is when the chair, frame, and wheels are all in equilibrium. Vertical V1 and vertical V2 are separately sensed from the true vertical. It is the continuous sensing and controlling of these three states that allow the WPC to be actively stabilizing, regardless of the ground contact angle or forward (or backward) motion.

Referring to FIG. 6, which is a schematic of FIG. 5, the first vertical position V1 that passes through second pivot 22 and is the imaginary vertical line from a moment arm k that represents the chair 20. The second vertical position V2 is the imaginary vertical line that passes through first pivot 18 and from a moment arm L1 that represents the frame 16. The moment arm L1 extends from the first pivot 18 to CM1. The moment arm k extends from the second pivot 22 to CM2. Additional physical parameters are defined by the radius of the wheels r, the arm length L2 between the first pivot 18 and the second pivot 22, the ground surface angle $\Psi$ from a horizontal surface and the masses and moments of inertia of the wheel, frame, and chair/passenger m1 and J1, m2 and J2, and m3 and J3, respectively.

The radius r, the length L2, the two moment arms k and L1, and CM1, and the masses and moments of inertia (m1–m3, J1–J3) are all known constants that are individual to the particular WPC, and can be initialized into controller 36. The three degrees of freedom $\alpha$, $\theta$, and $\phi$ are variable and dynamic, as is the center of mass of the chair/passenger CM2 (for example the passenger moving about in the chair) and the surface angle $\Psi$.

Three additional states related to $\alpha$, $\theta$, and $\phi$, are the angular velocity of the chair/passenger $\dot\alpha$, the angular velocity of the frame $\dot{\theta}$, and the angular velocity of the wheels $\dot{\phi}$. These three states, $\dot{\alpha}$, $\dot{\theta}$, and $\dot{\phi}$ (the three velocity states) are calculated as a first derivative of observed absolute angular acceleration of the frame, and the relative angular velocities between the frame and the chair and the frame and wheels (the measured outputs). The measured outputs can be obtained through the use of readily available devices, such as an accelerometer on the frame and tachometers between the frame and the chair and the frame and the wheels. Thus, the state $\dot{\theta}$ can be calculated directly by means of an accelerometer mounted directly to the frame 16. The states $\dot{\alpha}$ and $\dot{\phi}$ can then be calculated through direct measurements from the value of $\dot{\theta}$ by tachometers, or a discrete derivative of encoder output. In the control system, the three velocity states $\dot{\alpha}$, $\dot{\theta}$, $\dot{\phi}$ are used to estimate the three degrees of freedom $\alpha$, $\theta$ and $\phi$.

In use, $\alpha$ and $\phi$ are controlled by the controller to actively stabilize the WPC 10. The passenger controls $\phi$ directly through some external device mounted on the controller, such as a common two-axis joy stick. Another passenger input, which is a desired reference angle of the chair, may be controlled through a separate knob or lever attached to the controller. Steering the WPC is not discussed as it is not part of this invention. Braking is accomplished by applying a negative value (or zero) of $\dot{\phi}$ on the joy stick, and will not be further discussed.

Figure 7:
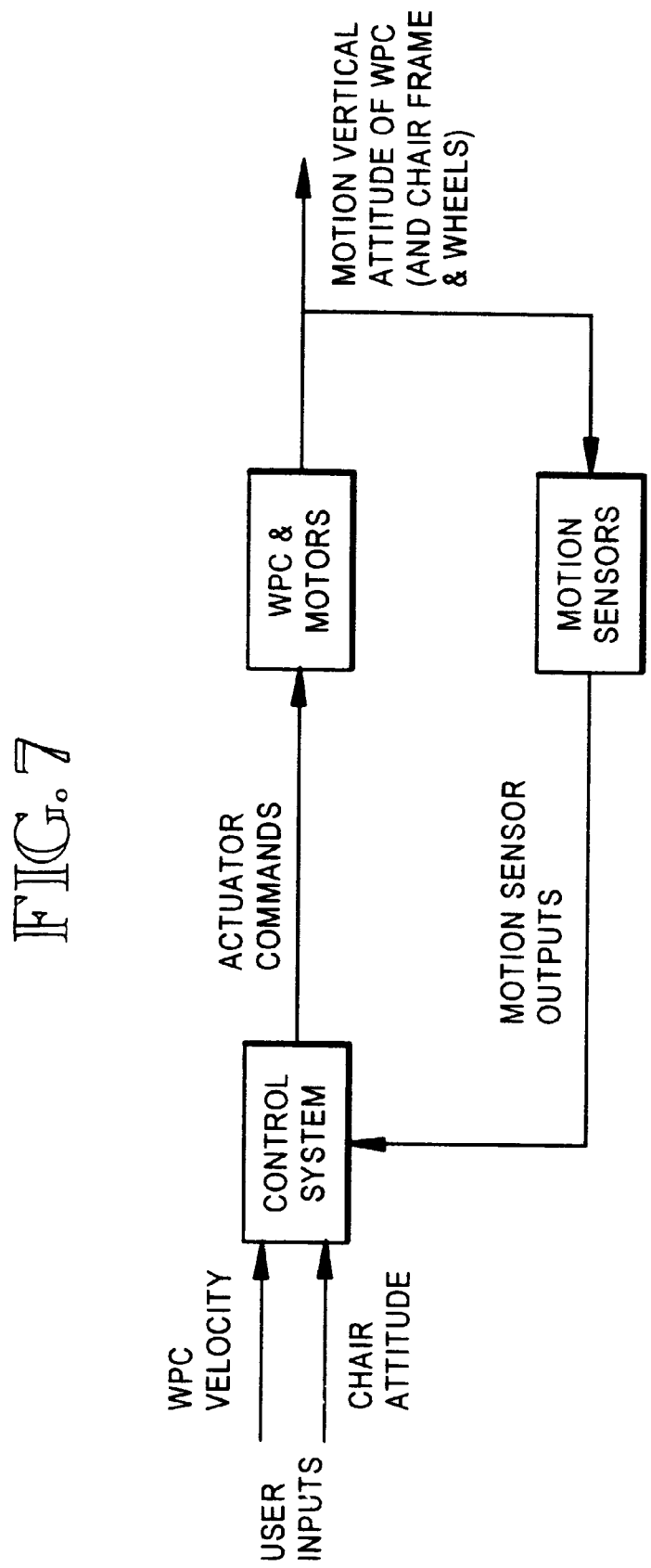
FIG. 7 is a block diagram of the basic sensing and control commands for active stabilization of the WPC.

In FIG. 7, the control means to sense and control the three degrees of freedom are shown in a basic block diagram. The passenger inputs a desired WPC speed or velocity. The passenger also can manually control the chair attitude, which is a reference angle from a vertical position (V1) or a position along a linkage of the chair (discussed later in the alternative embodiments) to aid in rider comfort and/or clearance problems as discussed later in detail.

Once the desired passenger inputs are entered, the control system (the electronic controller) continuously senses the various inputs and sends actuator commands to the WPC 10 and its first and second motor assemblies 32, 34 which provide torques through which the controller controls the states, affecting the WPC and its components: the chair 20, frame 16 and wheels 14. Motion sensors sense outputs, which are continuously fed back into the controller. The controller monitors and adjusts for the dynamic changes in the movement of the WPC and the passenger.

Although this invention may be programmed in a variety of ways, the preferred method begins by generating a Lagrangian model L from energy equations and then linearizing about a specified operation point to produce a linearized equation of motion along the ground surface at angle $\Psi$. First, the instantaneous kinetic T and potential V energies of the model are defined:

$$L = T - V$$

or:

$$L = \frac{1}{2}\begin{bmatrix} (m_1 r^2 + J_1)\dot{\phi}^2 + \\ m_2\begin{pmatrix} (r\dot{\phi}\cos(\psi) + L_1\dot{\theta}\cos(\theta))^2 + \\ (r\dot{\phi}\sin(\psi) - L_1\dot{\theta}\sin(\theta))^2 \end{pmatrix} + J_2\dot{\theta}^2 + \\ m_3\begin{pmatrix} (r\dot{\phi}\cos(\psi) + L_2\dot{\theta}\cos(\theta) + k\dot{\alpha}\cos(\alpha))^2 + \\ (r\dot{\phi}\sin(\psi) - L_2\dot{\theta}\sin(\theta) - k\dot{\alpha}\sin(\alpha))^2 \end{pmatrix} + J_3(\dot{\theta}^2 + \dot{\alpha}^2) \end{bmatrix} -$$

$$((m_1 + m_2 + m_3)gr\phi\sin(\psi) + m_2 g L_1\cos(\theta) + m_3 g(k\cos(\alpha) + L_2\cos(\theta)))$$

where g is the acceleration of gravity, and m1, J1, m2, J2, m3 and J3 are the masses and moments of inertia of the wheel, frame and chair/passenger respectively. The Lagrangian energy equation is solved to obtain the differential equations of motion of the model:

$$\frac{d}{dt}\left[\frac{\partial L}{\partial \dot{Q}}\right] - \frac{\partial L}{\partial Q} = U$$

where Q, the generalized coordinates, are Q1=$\phi$, Q2=$\phi$, Q3=$\alpha$ and inputs U are U1=$\tau$1-f1 ($\dot{\phi}$-$\dot{\theta}$), U2=$\tau$2-$\tau$1-f1 ($\dot{\theta}$-$\dot{\phi}$) and U3=-$\tau$2-f2 ($\dot{\alpha}$). $\tau$1, $\tau$2, f1 and f2 are the values for the wheel/frame input torque, frame/chair input torque, and damping at the first and second pivots respectively. The differential equations of motion as functions of the three degrees of freedom are then solved. The differential equations are linearized around an appropriate operating point that describes an equilibrium condition. The equations of motion are written as a set of second-order equations for $$\frac{d^2\phi}{dt^2}, \frac{d^2\alpha}{dt^2}$$

and $$\frac{d^2\theta}{dt^2},$$

which can be reduced to a set of first-order equations:

$$\frac{d^2\phi}{dt^2} = \frac{d}{dt}\left(\frac{d\phi}{dt}\right),$$

$$\frac{d\phi}{dt} = \frac{d}{dt}(\phi), \text{etc.}$$

This set of first-order equations may be written as state equations as a function of the states x and the inputs u:

$$\dot{x} = f(x, u)$$

where x1=$\phi$, x2=$\dot{\phi}$, x3=$\theta$, x4=$\dot{\theta}$, x5=$\alpha$, x6=$\dot{\alpha}$, u1=$\tau$1, u2=$\tau$2. For each state, the function is then expanded as a Taylor series about a chosen equilibrium condition for the operating point as a function of the states and inputs:

$$\left(\left(f(x, u) = f(x_o, u_o) + \frac{\partial f(x, u)}{\partial x}\bigg|_{x_o, u_o}(x - x_o) + \frac{\partial f(x, u)}{\partial u}\bigg|_{x_o, u_o}(u - u_o) + \ldots\right.\right.$$

A partial derivative (Jacobean) matrix is formed:

$$\dot{x} = Ax + Bu$$

which is the state equation, where the elements of A and B are:

$$a_{if} = \frac{\partial f_i(x, u)}{\partial x_j}\bigg|_{x_o, u_o} \text{ and } b_{if} = \frac{\partial f_i(x, u)}{\partial u_j}\bigg|_{x_o, u_o}$$

A and B matrices are created by linearizing around operating points, which may be calculated by the use of a program such as Maple V, Release 3, Waterloo Maple Software, Waterloo, Ontario, Canada. Values are assigned to the parameters and equilibrium initial conditions for the equilibrium state around the operating points.

The control system is designed with a regulator design, state feedback. The initial step in the controller design is implementation of a full state feedback (FSF) regulator. The linear control law is:

$$u = -Kx$$

giving a closed loop system $$\dot{x} = (A - BK)x$$

The poles of the closed-loop system are set by manipulation of the feedback gains in K. This can be done by any number of methods, such as pole placement, PID (proportional integral derivative), etc. To optimize the performance and response of the system, a linear quadratic regulator (LQR) is applied. The gains K can be found through the use of the Riccati equation, not shown or derived here, but which is a commonly known control equation for solving some number of equations with the same number of variables. The continuous Riccati equation is shown in the reference *Modern Control Theory*, 3rd Ed. by William L. Brogan, Ph.D., Prentice Hall Copyright 1991 (ISBN 0-13-589763-7). The optimal gains for K may be found such that the control law (u=−Kx) minimizes the cost function:

$$J = \int \{x^T Q x + u^T R u\} dt$$

subject to the constraint of control law to the system: $\dot{x}=Ax+Bu$ and $y=Cx$ (the output equation), where Y is the vector of outputs, and C is a matrix relating the states of the control system to the motion sensor outputs. Q and R of the cost function equation are matrices of weighting values placed on the states x and inputs u, respectively. In use, the Maple file gives the values of A and B. This program could then be converted to C-code and sent to an external file, such as Matlab Version 4.2c.1, by Math Works, Inc., Natick, Mass., USA to determine the value of K. Code for implementing this operation is included in the appendix.

In addition to FSF, the control system includes feed forward (FF) or integral error feedback (IEF). In preferred form, the control system includes both FF and IEF. During normal operation, zero steady state error for both forward velocity and chair attitude are desired. Values for the IEF gain matrix Ki are found by augmenting Q with the weights desired on the two new states. The LQR solution to the Riccati equation is then found for K, which is then separated into the appropriately sized submatrices of Kf for the FSF, and Ki for the IEF. In addition, to achieve acceptable behavior on flat surfaces, as well as ramps and steps, the integral gain for $\phi$ is increased to twice that of the LQR solution, and that of $\alpha$ is decreased to half.

Linearized FSF is ineffectual, however, except in close proximity to an equilibrium state. Feed Forward allows for rapid transition of plant (the WPC) configuration to a chosen state. In preferred form, if any chair attitude is chosen other than that for which there is no torque required at the first and second pivots 18, 22, feed forward is necessary.

Figure 8:
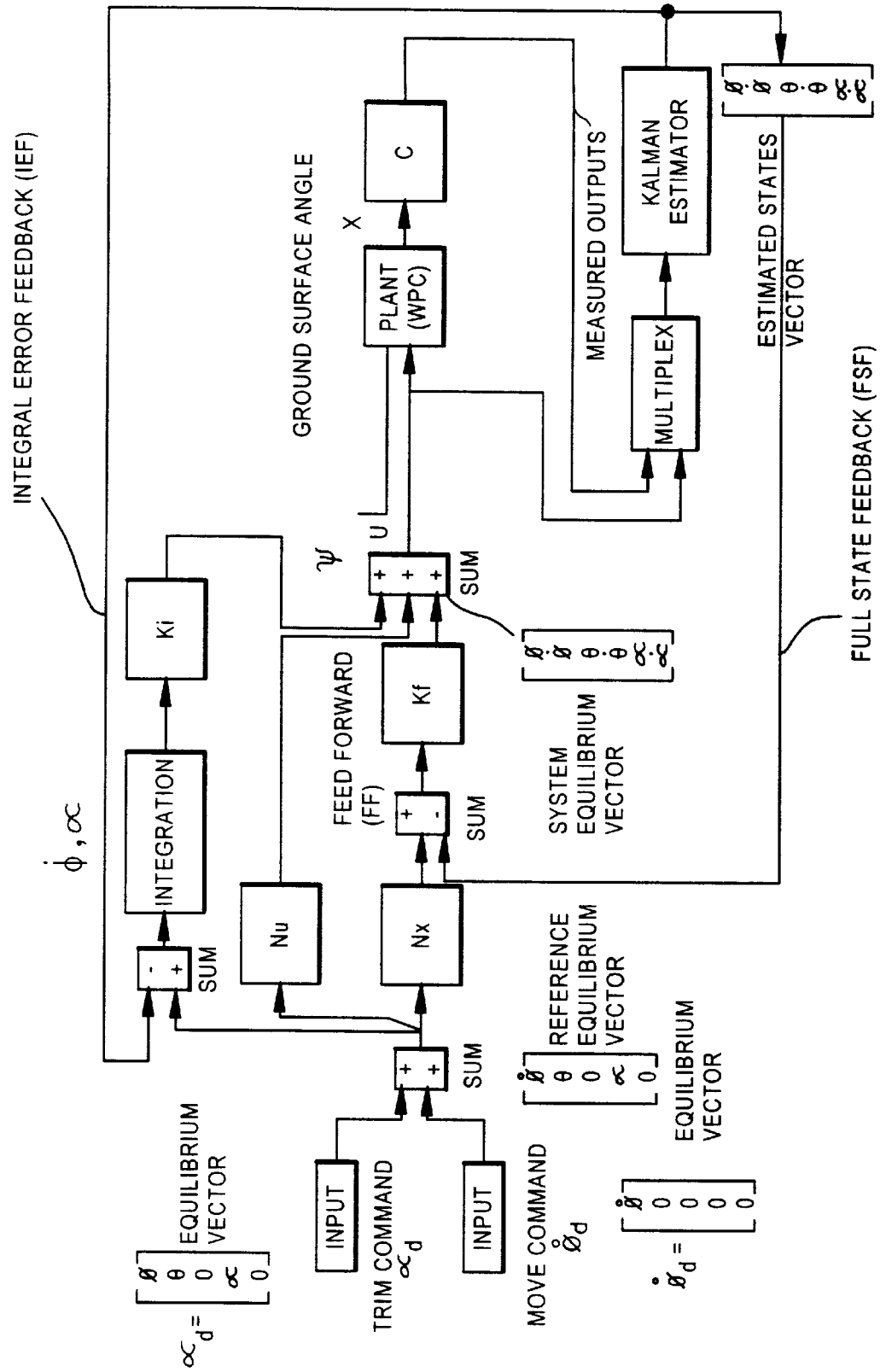
FIG. 8 is a more detailed diagram of FIG. 7 with a full state feedback loop with a reduced-order observer, a feed forward command and an integral error feedback loop.

Referring to the block diagram of FIG. 8, the "chair attitude" of FIG. 7 is also called the trim command or $\alpha_d$, which is corresponding to a reference value of $\alpha$. The "WPC velocity" of FIG. 7 is also called the move command or $\dot{\phi}_d$, which is corresponding to a reference value of $\dot{\phi}$ into the controller 36 (through use of a joy stick referenced above). Each of these passenger inputs are actually an equilibrium vector, that when added together forms the reference equilibrium vector. The reference equilibrium vector is read into and fed separately into the FSF loop, the IEF loop, and FF at repetitive time steps.

The FSF loop includes an input control gain vector (Nx), which is fed into and multiplied by the feedback gains Kf. The values of Kf, along with the values from FF and the IEF are added to become a system input u, which is a system equilibrium vector comprising the three degrees of freedom and their derivatives (the three velocity states). Input u is fed directly into the first and second motors assemblies 32, 34 of the WPC 10 (plant). This is the signal that dictates the amount of torque (from the motors) provided to the wheels 14 and chair 20.

The FSF loop essentially measures the positive or negative error of all of the states in each particular time step (not cumulative) and signals to the motors to apply appropriate torques according to the sensed error. In the FSF loop, the system input u is fed directly into the WPC (or plant) into the C matrix, which represents the sensor measurements. The measured outputs (as discussed above) come from the sensor measurements of the C matrix. The measured outputs are multiplexed (vector augmentation) with the system input u into a reduced-order estimator, which in preferred form is a Kalman Estimator. The Kalman Estimator estimates the three estimated states $\alpha$, $\theta$, and $\phi$ and their derivatives (the three velocity states) from the three measured outputs to form an estimated states vector. The estimated states vector is compared to the reference equilibrium vector (the passenger inputs). The compared difference is sent back into the controller to be processed through the FSF loop and multiplied by the feedback gains Kf to become a function of the new system input u.

Full State Feedback also accounts for the surface angle $\Psi$, which is not directly sensed and functions as a system disturbance. As the ground surface angle $\Psi$ becomes irregular (i.e. a ramp, stairs, etc.) the controller senses that the WPC is not in equilibrium and signals a corrective response to regain equilibrium for that particular surface angle.

Feed Forward takes the passenger input (the reference equilibrium vector) and is multiplied by the gains in the feed forward gain vector Nu. This input is added with the inputs from the FSF loop and the IEF loop to become system input u, or the system equilibrium vector, which is directly fed into the plant (WPC). Full state feedback may fail in a situation where the WPC wants to remain stationary in a non-equilibrium position (or, in other words, the WPC is being given a reference position outside the linear range of the controller). Thus, FF provides for adjusting the WPC to a configuration near the reference equilibrium position by providing a direct response into the plant.

The integral error feedback (IEF) loop measures the cumulative error between the passenger inputs (the reference equilibrium vector) and estimated $\phi$ and $\alpha$ (from the Kalman Estimator), once the WPC is activated into the "on" mode. The summation of the reference equilibrium vector is summed with the negative or positive value of estimated $\phi$ and $\alpha$. The summed value of the estimated $\alpha$ and $\phi$ and the reference equilibrium vector is integrated with the previous values (errors) and is multiplied by the gains from the integral feedback gain matrix (Ki). This IEF error value, along with the FF and FSF inputs are added together to form the system input u, which is fed directly into the WPC (the plant). The IEF signals the motor assemblies to make significant changes in the torque applications in order to actively stabilize the WPC when large disturbances (stairs, for example) are present.

The number of states that can be controlled through IEF is limited to the number of control inputs. IEF can be designed to include $\theta$ as an IEF state depending on the desired function of the WPC by adding another control input or by changing the IEF $\alpha$ state to $\theta$.

Figure 9:
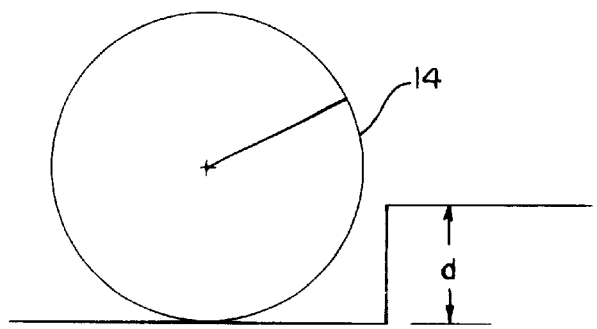
FIG. 9 is a schematic diagram depicting the wheels approaching a step.

There is no special command to the controller that indicates a stairclimbing (or other irregular terrain) activity. The passenger inputs a forward or reverse direction and a speed command. Referring to FIG. 9, when the WPC arrives at a step, whether going up or down, the wheels, frame and chair will rotate about the pivot axes from the applications of the torques from the motors in response to the changing surface angle and obstacles.

The WPC is able to traverse steps that are the steepest allowed under old (prior to 1985) Uniform Building Code, which is a riser of 7.5 inches and a tread of 10 inches. Because the foot rest 28 of the WPC 10 extends forward, it is desirable to traverse up stairs going backwards and to traverse down stairs going forwards. This "backward/up" and "forward/down" mode allows for maximum stability of the passenger and provides the most clearance for the passenger's feet and the chair's foot rest. The real limitation to the ability to traverse a step lies in the wheels' radius r. Radius r must be greater than the distance d of the riser of the step that the wheels are traversing. In addition, the wheels require some type of tires with an adequate tread to disallow slipping during actual traversing of the stairs.

Figure 10:
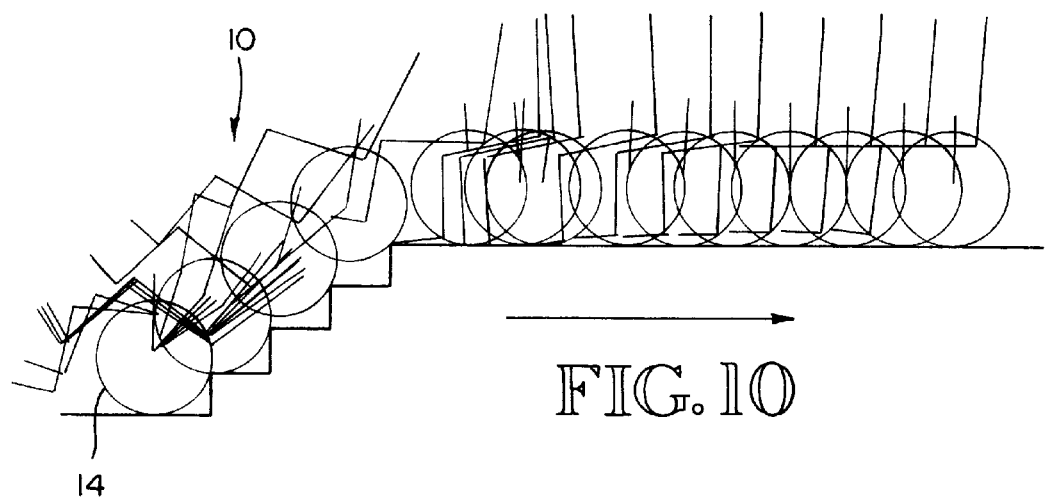
FIG. 10 is a schematic diagram of the WPC in the actively stabilizing mode with the WPC traversing up stairs in the "backward-up" mode.

Referring to FIG. 10, the passenger does not need to carry out any special procedure to make the wheels 14 traverse the step. FIG. 10 depicts the WPC 10 ascending a flight of four steps. In use, the speed of the WPC 10 has been determined by the passenger by the move command. The controller 36 signals the motor assemblies 32, 34 to provide the appropriate torques to the wheels 14 and the chair 20 to propel backward and still keep the chair/passenger upright. When the wheels 14 hit the first riser of the first step, the wheels 14, in essence, can not go further, yet the controller 36 is "signalling" the wheels 14 to propel backward. The TEF builds up a positive error in $\dot{\phi}$ with each cycle, because the wheels can not go further, but it is told to do so. Eventually (and within a matter of approximately 4 seconds) the positive error becomes large enough that the IEF compensates with a negative error large enough to overcome the positive error. This large negative error correlates to the torques at the wheels by the increase of the power to the motors assemblies. Simultaneously α becomes greater, and the chair/passenger is leaned into the stairs. At the point when the composite center of mass of the total WPC and passenger is above or beyond the contact point of the step (or ramp or curb), the WPC can proceed up the step. Once the first step has been traversed, α and θ become smaller and the chair/passenger is repositioned to a more upright position. At the top of the stairs, and back on level ground, α has become quite small and the chair/passenger is now positioned upright.

Figure 11:
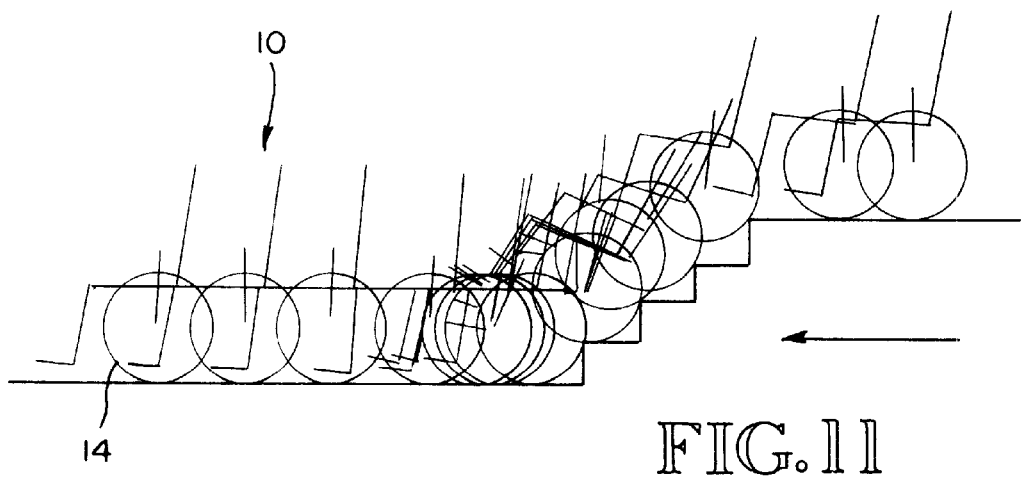
FIG. 11 is a schematic diagram of the WPC of FIG. 10 but with the WPC traversing down stairs in the "forward-down" mode.

Referring to FIG. 11, the reverse occurs in coming down the stairs. The WPC 10 moves at a speed that the passenger has determined. The wheels approach the step and rotate forward. The WPC 10 does not anticipate the step until the WPC 10 is over the first step. The wheel velocity $\dot{\phi}$ moves at an accelerated rate. The IEF senses this $\dot{\phi}$ and builds up negative error. As the WPC descends the steps, the negative error builds up and the IEF compensates through a large positive error to overcome the negative error. The controller controls the signals to the motor assemblies. Hence, the torques to the wheels 14 decrease to slow the speed of the wheels 14 and keep the WPC 10 stable during the descent. Effectively the wheels may stop during the descent to stabilize the WPC and, once stabilized, continue the process of descending the remaining steps.

Figure 12:
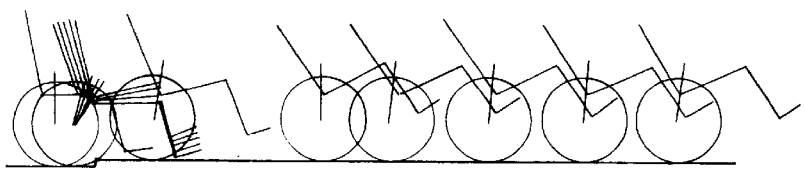
FIG. 12 is a schematic diagram like FIG. 10 but with the WPC traversing a curb in the forward mode.
Figure 13:
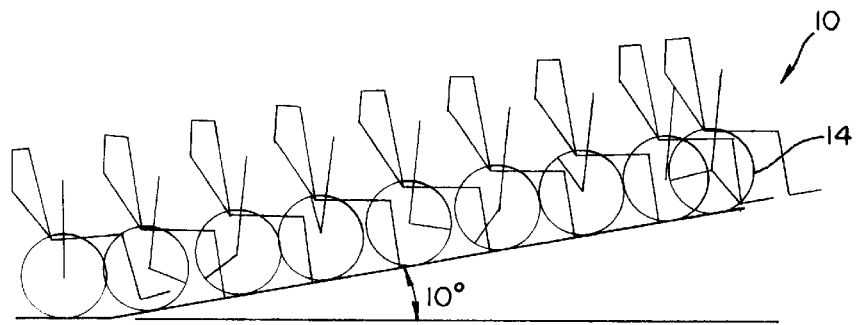
FIG. 13 is a schematic diagram of the WPC of FIG. 10 but with the WPC traversing a ten degree ramp.

Referring to FIG. 12, WPC 10 is also designed to be able to traverse low curbs in the forward mode. The controller senses the same parameters as described above in description of traversing stairs, and functions in the same way. However, in traversing relatively low to moderate ground irregularities, the passenger may elect to use the trim control (chair attitude $\alpha_d$) to aid in clearing the foot rests 28 of the chair 20 when traversing in the forward mode. An example of traversing a ten degree ramp in the forward mode is shown in FIG. 13.

Figure 14:
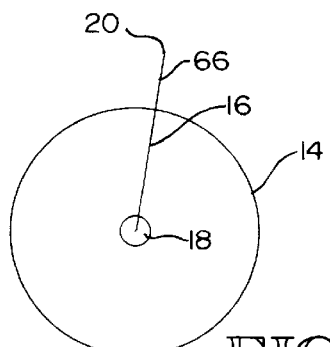
FIG. 14 is a schematic diagram of an alternate embodiment of the frame in which the frame is rigidly attached to the chair.

FIGS. 14–17 depict schematic views of alternate frame configurations. FIG. 14 depicts a rigid schematic arm 66 representing the frame 16 rigidly connected to the chair 20. One method of accomplishing the rigid connection of frame to chair is through welding. This alternative eliminates the need for the second pivot (identified in FIG. 1 at 22). With the chair and frame one rigid piece, there are only two degrees of freedom to control: the first being an angle between a vertical position and the chair/frame and the second being an angle between the wheel and the initial position.

Figure 15:
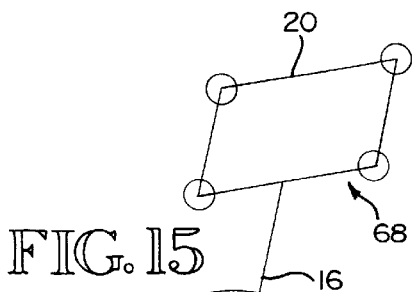
FIG. 15 is a schematic diagram of a second embodiment of the frame in which the chair is attached to the frame through a parallelogram linkage.
Figure 16:
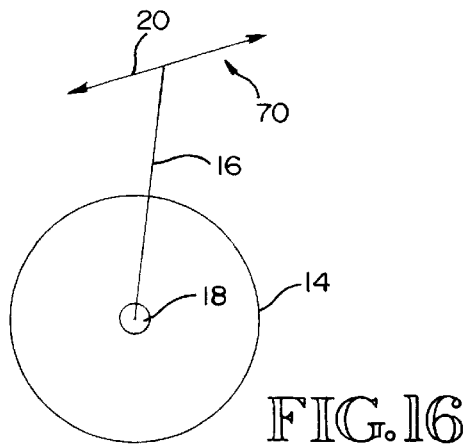
FIG. 16 is a schematic diagram of a third embodiment of the frame in which the chair is attached to the frame through a linear linkage.
Figure 17:
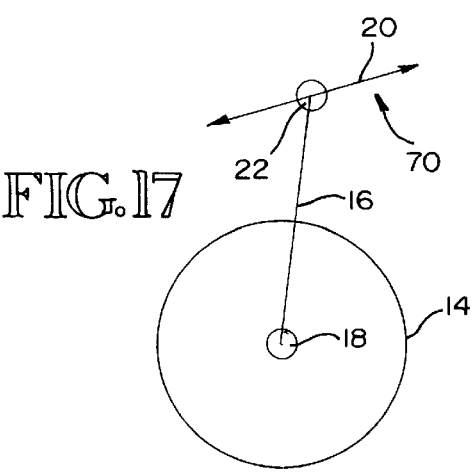
FIG. 17 is a schematic diagram is a fourth embodiment of the frame in which the chair is attached to the frame through a linkage and a pivot.

FIG. 15 is a schematic view of an alternate embodiment that uses a parallelogram linkage 68 in place of the second pivot 22. The chair 20 can move in a rotating fashion within the confines of the parallelogram linkage 68. FIG. 16 depicts a linear linkage 70 in place of the second pivot 22, in order to allow the chair to translate within the confines of the linear linkage 70. The degrees of freedom that are sensed and controlled with the linkage are the angles θ and φ and the distance that the chair 20 travels along the linkage. FIG. 17 is a schematic diagram showing the combination of a frame, linkage (a linear linkage is shown) and a pivot 22. In this embodiment, there are four degrees of freedom to sense and control: α, θ, and φ, as well as the distance the chair 20 travels along the linkage. In this embodiment, the chair 20 can either rotate on the linkage fixed to the frame 16 or the linkage attached to the chair 20 can rotate on the frame 16.

This invention also includes a method of operation, the steps of the method have already been discussed above.

The illustrated and described embodiments are presented by way of example. The scope of protection is not to be limited by these examples. Rather, protection is to be determined by the claims which follow, construed in accordance with established rules of patent claim construction, including use of the doctrine of equivalents and reversal of parts.

What is claimed is:

1. An actively stabilizing wheeled passenger carrier capable of traversing stairs comprising:

a wheel assembly having at least two axially-spaced wheels, each said wheel having an axis of rotation;

a rigid frame having at least two pivots, wherein the first of said pivots attaches said frame to said wheel assembly;

a chair, wherein the second of said pivots attaches said frame to said chair, allowing said chair rotational movement about the second pivot independent of the wheels;

a first motor assembly to apply torque between said wheels and said frame;

a second motor assembly to apply torque between the frame and the chair; and control means to sense and control three degrees of freedom: the first being an angle between the chair and a vertical position, the second being an angle between the frame and the vertical position, and the third being an angle between the wheels and an initial position, such control being accomplished through application of torques from the first and second motor assemblies;

wherein the control means controls the three degrees of freedom to actively stabilize the wheeled passenger carrier to keep a passenger essentially upright during movement, including traversing stairs and the like, and wherein the control means includes a means to directly sense three measured outputs: the first being an absolute angular acceleration of the frame, the second being a relative angular velocity between the frame and the chair, and the third being a relative angular velocity between the frame and the wheels.

2. The wheeled passenger carrier according to claim 1, wherein three velocity states are calculated from the three measured outputs, wherein the first velocity state being an absolute angular velocity of the frame, and the second being an absolute angular velocity of the wheels, and the third being an absolute angular velocity of the chair.

3. The wheeled passenger carrier according to claim 2, wherein a reduced-order estimator estimates the values of the three degrees of freedom based on the three velocity states.

4. The wheeled passenger carrier according to claim 1, wherein the control means include an electronic controller that senses and controls the wheeled passenger carrier through a full-state feedback loop and a feed forward command.

5. The wheeled passenger carrier according to claim 1, wherein the control means include an electronic controller that senses and controls the wheeled passenger carrier through a full state feedback loop and an integral error feedback loop.

6. The wheeled passenger carrier according to claim 1, wherein the control means include an electronic controller that senses and controls the wheeled passenger carrier through a full state feedback loop, a feed forward command and an integral error feedback loop.

7. The wheeled passenger carrier according to claim 1, wherein the wheeled passenger carrier includes at least one idler wheel.

8. An actively stabilizing wheeled passenger carrier capable of traverse stairs comprising:

a wheel assembly having at least two axially-spaced wheels, each said wheel having an axis of rotation;

a rigid frame including a double-inverted pendulum having at least two pivots, wherein the first of said pivots attaches said frame to said wheel assembly;

a chair, wherein the second of said pivots attaches said frame to said chair, allowing said chair rotational movement about the second pivot independent of the wheels;

a first motor assembly to apple torque between the wheels and said frame;

a second motor assembly to apply torgue between the frame and the chair; and control means to sense and control three degrees of freedom: the first being an angle between the chair and a vertical position, the second being an angle between the frame and the vertical position, and the third being an angle between the wheels and an initial position, such control being accomplished through application of torques from the first and second motor assemblies;

wherein the control means controls the three degrees of freedom to actively stabilize the wheeled passenger carrier to keep a passenger essentially upright during movement, including traversing stairs and the like, wherein the control means includes an electronic controller that continually senses three measured outputs: the first being an absolute angular acceleration of the frame, the second beings a relative angular velocity between the frame and the chair, and the third being a relative angular velocity between the frame and the wheels and, wherein three velocity states are continually calculated from the continually sensed three measured outputs, wherein the first velocity state is an absolute angular velocity of the frame, the second velocity state is an absolute angular velocity of the wheels, and the third being an absolute angular velocity of the chair, and wherein estimates of the three degrees of freedom are continually made by an estimator based on the continually calculated velocity states, and are continually fed back to the controller to continually control the application of torque from the first and second motor assemblies to between the wheels and the frame and between the frame and the chair, respectively.

9. The wheeled passenger carrier according to claim 8, wherein the estimator is a reduced-order estimator.

10. The wheeled passenger carrier according to claim 8, wherein the controller includes full state feedback and feed forward.

11. The wheeled passenger carrier according to claim 8, wherein the controller includes full state feedback and integral error feedback.

12. The wheeled passenger carrier according to claim 8, wherein the controller includes full state feedback, feed forward, and integral error feedback.

13. The wheeled passenger carrier according to claim 8, wherein the controller continually senses the three measured outputs at a periodic sampling rate of 1000 times per second.

* * * * *